United States Patent
Tohara et al.

(10) Patent No.: US 10,263,295 B2
(45) Date of Patent: Apr. 16, 2019

(54) SECONDARY BATTERY SYSTEM AND METHOD OF ARRANGING BATTERY MODULE

(71) Applicant: Kabushiki Kaisha Toshiba, Minato-ku (JP)

(72) Inventors: Masahiro Tohara, Fuchu (JP); Mami Mizutani, Hachioji (JP); Masayuki Kubota, Musashino (JP); Takenori Kobayashi, Meguro (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 91 days.

(21) Appl. No.: 15/301,321

(22) PCT Filed: Feb. 24, 2015

(86) PCT No.: PCT/JP2015/055160
§ 371 (c)(1),
(2) Date: Sep. 30, 2016

(87) PCT Pub. No.: WO2015/151652
PCT Pub. Date: Oct. 8, 2015

(65) Prior Publication Data
US 2017/0033410 A1    Feb. 2, 2017

(30) Foreign Application Priority Data

Apr. 1, 2014  (JP) .................................. 2014-075317

(51) Int. Cl.
*H01M 10/46* (2006.01)
*H01M 10/42* (2006.01)
(Continued)

(52) U.S. Cl.
CPC ....... *H01M 10/425* (2013.01); *H01M 2/1077* (2013.01); *H01M 10/482* (2013.01);
(Continued)

(58) Field of Classification Search
CPC ...... H02J 7/0021; H02J 7/0026; H02J 7/0006; H02J 7/0091; H02J 7/047
(Continued)

(56) References Cited

U.S. PATENT DOCUMENTS 6,573,685 B2   6/2003  Nakanishi et al.
8,483,886 B2   7/2013  Onnerud et al.
(Continued)

FOREIGN PATENT DOCUMENTS

JP    11-234909 A    8/1999
JP    2002-15781 A   1/2002
(Continued)

OTHER PUBLICATIONS

Translation of JP 2012-034439 (Feb. 16, 2012).*
(Continued)

*Primary Examiner* — Edward Tso
(74) *Attorney, Agent, or Firm* — Oblon, McClelland, Maier & Neustadt, L.L.P.

(57) ABSTRACT

A secondary battery system and a method of arranging battery modules capable of recovering and maintaining the system performance are provided. A secondary battery system includes a battery cabinet group including a plurality of battery cabinets each comprising a plurality of battery modules connected to each other, the battery module being a replacement unit, a PCS connected to the battery cabinet group and is controlling charging and discharging thereof, and a battery controller connected to the PCS. The battery controller includes a deterioration inspecting block obtaining a characteristic of the battery modules, a numbering block numbering the battery modules in an ascending order based on the characteristics, and a re-arrangement determining block determining a re-arrangement position of the
(Continued)

battery modules in a way that the numbers given by the numbering block are in sequence in the same battery cabinet.

10 Claims, 8 Drawing Sheets

(51) Int. Cl.
    *H01M 10/48*     (2006.01)
    *H02J 7/00*     (2006.01)
    *H01M 2/10*     (2006.01)

(52) U.S. Cl.
    CPC ......... *H01M 10/486* (2013.01); *H02J 7/0021* (2013.01); *H02J 7/0024* (2013.01); *H02J 7/0045* (2013.01); *H01M 2010/4271* (2013.01); *H01M 2220/10* (2013.01)

(58) Field of Classification Search
    USPC ......... 320/116, 132, 149, 150; 361/724, 733
    See application file for complete search history.

(56) References Cited

U.S. PATENT DOCUMENTS

| | | |
|---|---|---|
| 2011/0213509 A1 | 9/2011 | Onnerud et al. |
| 2013/0049457 A1* | 2/2013 | Komatsu ............... H02J 7/0014 307/9.1 |
| 2014/0154558 A1 | 6/2014 | Onnerud et al. |
| 2014/0354237 A1* | 12/2014 | Cotton .................. H02J 7/0016 320/134 |
| 2016/0056510 A1* | 2/2016 | Takeuchi ............ H01M 10/482 429/7 |

FOREIGN PATENT DOCUMENTS

| | | |
|---|---|---|
| JP | 2008-118790 A | 5/2008 |
| JP | 2011-177025 A | 9/2011 |
| JP | 2012-34439 A | 2/2012 |
| JP | 2012-210039 A | 10/2012 |
| JP | 2014-11060 A | 1/2014 |
| KR | 10-2012-0060820 A | 6/2012 |

OTHER PUBLICATIONS

International Search Report dated May 12, 2015 in PCT/JP2015/055160 Filed Feb. 24, 2015.

International Preliminary Report of Patentability dated Sep. 30, 2016 in Patent Application No. PCT/JP2015/055160 (English translation only).

* cited by examiner

[Table 1]
Reference status (no characteristic variability) Average value 0.5, Standard deviation 0

② Parallel

|  | | Battery board 1 | Battery board 2 | Battery board 3 | Battery board 4 | Battery board 5 | Battery board 6 | Battery board 7 | Battery board 8 | Battery board 9 | Battery board 10 | |
|---|---|---|---|---|---|---|---|---|---|---|---|---|
| ① Series | Module 1 | 0.500 | 0.500 | 0.500 | 0.500 | 0.500 | 0.500 | 0.500 | 0.500 | 0.500 | 0.500 | |
| | Module 2 | 0.500 | 0.500 | 0.500 | 0.500 | 0.500 | 0.500 | 0.500 | 0.500 | 0.500 | 0.500 | |
| | Module 3 | 0.500 | 0.500 | 0.500 | 0.500 | 0.500 | 0.500 | 0.500 | 0.500 | 0.500 | 0.500 | |
| | Module 4 | 0.500 | 0.500 | 0.500 | 0.500 | 0.500 | 0.500 | 0.500 | 0.500 | 0.500 | 0.500 | |
| | Module 5 | 0.500 | 0.500 | 0.500 | 0.500 | 0.500 | 0.500 | 0.500 | 0.500 | 0.500 | 0.500 | |
| | Module 6 | 0.500 | 0.500 | 0.500 | 0.500 | 0.500 | 0.500 | 0.500 | 0.500 | 0.500 | 0.500 | |
| | Module 7 | 0.500 | 0.500 | 0.500 | 0.500 | 0.500 | 0.500 | 0.500 | 0.500 | 0.500 | 0.500 | |
| | Module 8 | 0.500 | 0.500 | 0.500 | 0.500 | 0.500 | 0.500 | 0.500 | 0.500 | 0.500 | 0.500 | |
| | Module 9 | 0.500 | 0.500 | 0.500 | 0.500 | 0.500 | 0.500 | 0.500 | 0.500 | 0.500 | 0.500 | (Battery board total) |
| | Module 10 | 0.500 | 0.500 | 0.500 | 0.500 | 0.500 | 0.500 | 0.500 | 0.500 | 0.500 | 0.500 | System performance |
| Battery board performance (Minimum module value) | | 0.500 | 0.500 | 0.500 | 0.500 | 0.500 | 0.500 | 0.500 | 0.500 | 0.500 | 0.500 | 5.000 |

*FIG. 8*

[Table 2]

Before re-arrangement (random variability)    Normal distribution random number with average value of 0.5 and standard deviation of 0.2

② Parallel →

|  |  | Battery board 1 | Battery board 2 | Battery board 3 | Battery board 4 | Battery board 5 | Battery board 6 | Battery board 7 | Battery board 8 | Battery board 9 | Battery board 10 |  |
|---|---|---|---|---|---|---|---|---|---|---|---|---|
| ① Series | Module 1 | 0.525 | 0.544 | 0.477 | 0.558 | 0.495 | 0.541 | 0.513 | 0.503 | 0.652 | 0.438 | |
| | Module 2 | 0.555 | 0.443 | 0.595 | 0.386 | 0.543 | 0.440 | 0.546 | 0.546 | 0.465 | 0.398 | |
| | Module 3 | 0.451 | 0.474 | 0.493 | 0.261 | 0.658 | 0.555 | 0.536 | 0.623 | 0.516 | 0.431 | |
| | Module 4 | 0.489 | 0.500 | 0.503 | 0.474 | 0.471 | 0.547 | 0.471 | 0.389 | 0.519 | 0.435 | |
| | Module 5 | 0.295 | 0.495 | 0.515 | 0.374 | 0.541 | 0.548 | 0.430 | 0.515 | 0.525 | 0.511 | |
| | Module 6 | 0.483 | 0.566 | 0.517 | 0.426 | 0.523 | 0.501 | 0.475 | 0.519 | 0.573 | 0.426 | |
| | Module 7 | 0.435 | 0.335 | 0.394 | 0.542 | 0.743 | 0.500 | 0.442 | 0.537 | 0.452 | 0.536 | |
| | Module 8 | 0.746 | 0.516 | 0.418 | 0.493 | 0.665 | 0.474 | 0.278 | 0.414 | 0.528 | 0.475 | |
| | Module 9 | 0.382 | 0.582 | 0.459 | 0.460 | 0.561 | 0.599 | 0.467 | 0.310 | 0.517 | 0.452 | (Battery board total) System performance |
| | Module 10 | 0.491 | 0.467 | 0.491 | 0.352 | 0.593 | 0.556 | 0.503 | 0.283 | 0.597 | 0.416 | |
| Battery board performance (Minimum module value) | | 0.295 | 0.335 | 0.394 | 0.261 | 0.471 | 0.440 | 0.278 | 0.283 | 0.452 | 0.398 | 3.605 |

*FIG. 9*

[Table 3]

Before re-arrangement (random variability) — Sort normal distribution random number with average value of 0.5 and standard deviation of 0.2

② Parallel →

① Series ↓

| | Battery board 1 | Battery board 2 | Battery board 3 | Battery board 4 | Battery board 5 | Battery board 6 | Battery board 7 | Battery board 8 | Battery board 9 | Battery board 10 | |
|---|---|---|---|---|---|---|---|---|---|---|---|
| Module 1 | 0.746 | 0.623 | 0.582 | 0.544 | 0.519 | 0.495 | 0.475 | 0.459 | 0.431 | 0.386 | |
| Module 2 | 0.743 | 0.616 | 0.566 | 0.542 | 0.519 | 0.495 | 0.474 | 0.452 | 0.430 | 0.382 | |
| Module 3 | 0.695 | 0.616 | 0.561 | 0.541 | 0.517 | 0.493 | 0.474 | 0.452 | 0.426 | 0.374 | |
| Module 4 | 0.673 | 0.613 | 0.558 | 0.537 | 0.517 | 0.493 | 0.474 | 0.451 | 0.426 | 0.362 | |
| Module 5 | 0.665 | 0.603 | 0.556 | 0.536 | 0.516 | 0.491 | 0.471 | 0.443 | 0.418 | 0.335 | |
| Module 6 | 0.658 | 0.603 | 0.556 | 0.536 | 0.516 | 0.491 | 0.471 | 0.442 | 0.416 | 0.310 | |
| Module 7 | 0.652 | 0.600 | 0.555 | 0.528 | 0.511 | 0.489 | 0.467 | 0.440 | 0.414 | 0.295 | |
| Module 8 | 0.647 | 0.599 | 0.549 | 0.525 | 0.503 | 0.483 | 0.467 | 0.438 | 0.398 | 0.283 | |
| Module 9 | 0.646 | 0.597 | 0.548 | 0.525 | 0.501 | 0.477 | 0.465 | 0.435 | 0.394 | 0.278 | (Battery board total) |
| Module 10 | 0.641 | 0.593 | 0.545 | 0.523 | 0.500 | 0.476 | 0.460 | 0.435 | 0.389 | 0.261 | System performance |
| Battery board performance (Minimum module value) | 0.641 | 0.593 | 0.545 | 0.523 | 0.500 | 0.476 | 0.460 | 0.435 | 0.389 | 0.261 | 4.824 |

FIG. 10

SECONDARY BATTERY SYSTEM AND METHOD OF ARRANGING BATTERY MODULE

CROSS-REFERENCE TO RELATED APPLICATIONS

This application is based upon and claims priority of Japanese Patent Application No. 2014-075317, filed on Apr. 1, 2014, the entire contents of which is incorporated herein by reference.

FIELD

Embodiments of the present disclosure relate to a secondary battery system and a method of arranging battery modules which are capable of recovering a system performance, and which are capable of maintaining the system performance in the long term.

BACKGROUND

For applications of suppressing a power generation fluctuation which utilizes natural energy like solar light and wind power, suppressing a power demand fluctuation, and peak shifting, the utilization of a large-scale secondary battery system including secondary batteries is expected. In particular, a large-scale secondary battery system that utilizes lithium-ion batteries which have a remarkably improved performance is becoming available in recent years. Regarding such large-scale secondary battery system, a long-term operation, such as 15 years or 20 years, is expected.

Regarding such large-scale battery system, a cell which is a minimum unit of the secondary battery in single or plurality connected in parallel are connected in series, and may further be connected in parallel. Hence, a series connection configuration and a parallel connection configuration are typically repeated hierarchically to construct the system. For a replacement unit of when malfunctioned or deteriorated, it is not general for the large-scale secondary battery system that utilizes lithium-ion batteries to make each single cell replaceable, but are a block, which is so-called a module or a unit, including several to dozens of cells In this specification, the minimum unit replacement will be referred to as a battery module.

CITATION LIST

Patent Literatures

Patent Document 1: JP2008-118790 A
Patent Document 2: JP2011-177025 A
Patent Document 3: JP2012-210039 A

SUMMARY OF INVENTION

Technical Problem

Regarding the cell that is the minimum unit of the secondary battery and the battery module including a plurality of such cells connected in parallel and in series, the performance deteriorates over time. In addition, the deterioration speed of each single cells or the battery modules differ when the utilization condition differs, and even if the same utilization condition is intended, the installment location (e.g., spatial arrangement and arrangement on a circuit) in addition to the individual difference also causes a variability in each strict utilization condition resulting in the variability of deterioration speed.

On the other hand, as for the performance of the group of cells or the group of batteries modules connected in series the one with the lowest characteristic in the series connection configuration decides the overall performance. Hence, when the performance variability among the series-connected cells and the battery modules spreads as the deterioration progresses, the performance deterioration of the entire secondary battery system would progress.

The object of the embodiments of the present disclosure is to provide a secondary battery system and a method of arranging battery modules which are capable of recovering a system performance and maintaining the system performance in the long term.

Solution to Problem

In order to accomplish the above object, a secondary battery system according to an embodiment of the present disclosure includes:

a battery cabinet group including a plurality of battery cabinets each including a plurality of battery modules connected to each other, the battery module being a replacement unit;

a PCS (Power Conditioning System) connected to the battery cabinet group and is controlling charging and discharging of the battery cabinet group; and a battery controller connected to the PCS, in which the battery controller includes:

a deterioration inspecting block obtaining a characteristic of each of the battery modules to inspect a deterioration status thereof;

a numbering block numbering each of the battery modules in an order from a small deterioration to a large deterioration based on the characteristic obtained by the deterioration inspecting block; and a re-arrangement determining block determining a re-arrangement position of each of the battery modules in such a way that numbers given by the numbering block are in sequence in the same battery cabinet.

In addition, a method of arranging battery modules executed in the above embodiment is also an embodiment of the present disclosure.

BRIEF DESCRIPTION OF DRAWINGS

FIG. 8 shows a Table 1 illustrating a first exemplary system performance calculation.

FIG. 9 shows a Table 2 illustrating a second exemplary system performance calculation.

FIG. 10 shows a Table 3 illustrating a third exemplary system performance calculation.

DESCRIPTION OF EMBODIMENTS

The embodiments of the present disclosure will be explained below in detail.

In this embodiment, an explanation will be given with an exemplary secondary battery system that has a plurality of battery modules connected in series, and plurality of them further connected in parallel. In the present embodiment, the deterioration status of each battery module is inspected at an specific timing during the operation of the secondary battery system, and each battery module is re-arranged in accordance with the result. More specifically, all battery modules in the secondary battery system are ranked corresponding to the deterioration progress, and the battery modules sequential to the ranking are re-arranged on the same series connection configuration group, thus accomplishing the recovery of the overall system performance by reducing the deterioration variability in the series connection configuration. A configuration of the secondary battery system according to the present embodiment will be explained below.

(Entire Configuration of Secondary Battery System)

Figure 1:
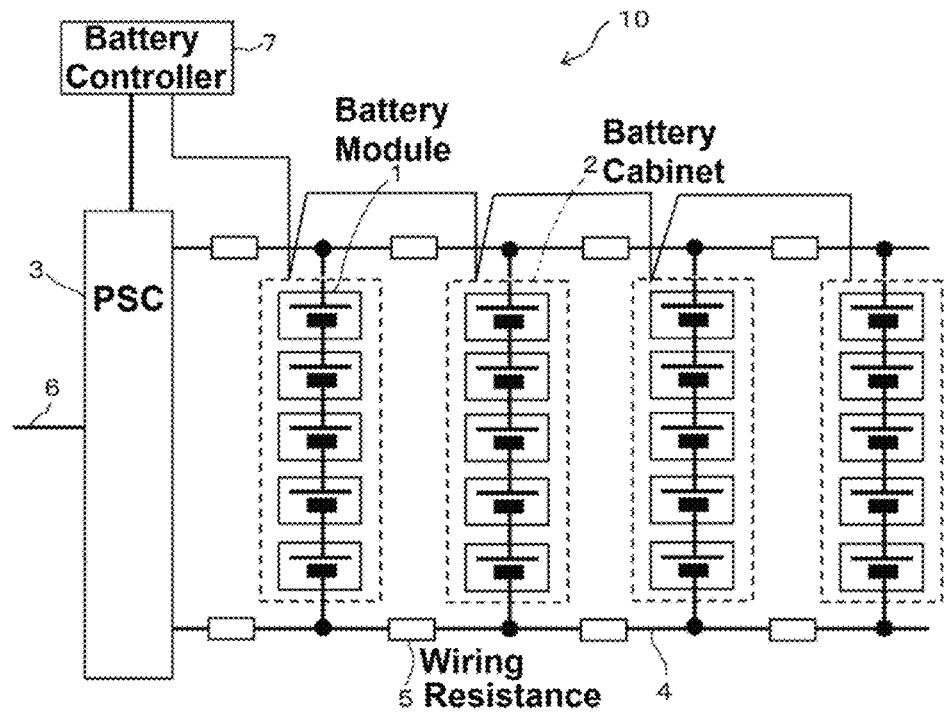
FIG. 1 is a schematic diagram illustrating an entire structure of a secondary battery system according to an embodiment of the present disclosure.

FIG. 1 illustrates an entire configuration of a secondary battery system according to the embodiment of the present disclosure.

In a secondary battery system 10, a plurality of battery modules 1 are connected in series to form a battery cabinet 2, and the plurality of battery cabinets 2 is connected in parallel to respective positive and negative terminals by wirings (DC) 4, and are connected to the DC terminal of PSC (Power Conditioning System, power converter) 3. In addition, the AC terminal of the PCS 3 is connected to an unillustrated power system via a wiring (AC) 6. Furthermore, the PCS 3 is connected to a battery controller 7 by a signal line to perform charging-discharging control on the group of battery cabinets 2 connected in parallel. The battery controller 7 and each battery cabinet 2 are also connected with each other by a signal line for a status monitoring.

The above battery module 1 is a plurality of cells connected in series or in parallel or in a serial-parallel combination, and is the minimum unit for replacement. In addition, in FIG. 1, in order to clearly describe the resistance component of the wiring (DC) 4, a wiring resistance 5 is arranged in the cross wiring between the battery cabinets 2, and between the PCS 3 and the battery cabinet 2.

Figure 2:
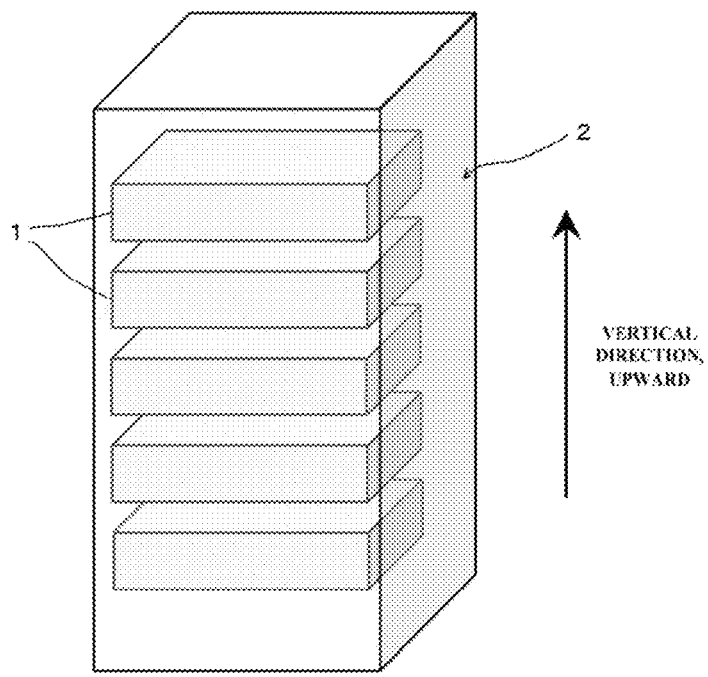
FIG. 2 is a perspective view illustrating an exemplary physical arrangement of battery modules in a battery cabinet.

FIG. 2 illustrates an exemplary physical arrangement of the battery modules in the battery cabinet 2. In this example, the plurality of battery modules 1 is stacked and arranged in the vertical direction in a metal casing to form the battery cabinet 2. Here, forced air cooling such as by a fan is not performed on the battery cabinet 2, but a natural air cooling structure by convection is employed.

(Configuration of Battery Controller)

Figure 3:
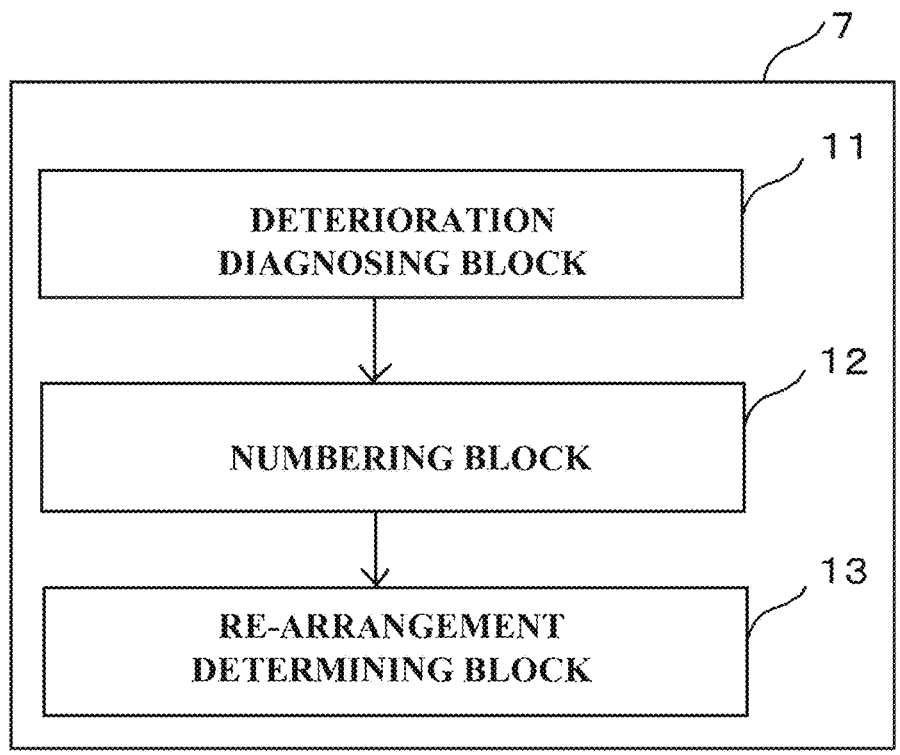
FIG. 3 is a block diagram illustrating a configuration of a battery controller.

FIG. 3 illustrates the detailed configuration of the battery controller 7.

The battery controller 7 includes a deterioration inspecting block 11 that performs a deterioration inspection on all battery modules 1, a numbering block 12 that performs a numbering on the battery module 1 in the system in accordance with the deterioration inspection result, and a re-arrangement determining block 13 that determines the re-arrangement location in accordance with the numbering.

(Deterioration Phenomenon of Lithium-Ion Battery)

Next, a deterioration phenomenon when lithium-ion batteries are applied will be explained. Typical parameters that change in accordance with the deterioration are a capacity and an internal resistance. The capacity decreases over time, while the internal resistance increases over time. One of the reasons that causes the capacity reduction is an increase of the internal resistance, but a natural capacity deterioration that are not caused by the internal resistance is also present. In general, the higher the battery temperature is, the faster the deterioration advance.

A specific explanation of the deterioration progress (characteristic change) in the secondary battery system 10 illustrated in FIG. 1 is given below. First, in the single battery cabinet 2, it is clear from the figure that the same current flows in the plurality of battery modules 1 connected in series. When the current flows in the battery module 1 (namely, when charging-discharging operations start), because the internal resistance is present in the battery module 1, Joule heat is generated, and the temperature of the battery module 1 rises. Consequently, the ambient temperature in the battery cabinet 2 also rises. In the case of the in-board arrangement illustrated in FIG. 2, the temperature in the heated battery cabinet 2 rises, and the temperature distribution in the battery cabinet 2 occurs in the vertical direction.

That is, the surrounding temperature of the battery module 1 at the higher position in the vertical direction becomes higher than the surrounding temperature of the battery module 1 at the lower position. Hence, the deterioration progress (internal resistance increase) of the battery module 1 at the higher position advances faster than the deterioration progress of the battery module 1 at the lower position. Consequently, the Joule heat generated when charging-discharging take place by the battery module 1 at the higher position is greater than that of the battery module 1 at the lower position. Accordingly, the temperature difference between the battery module 1 at the higher position and the battery module 1 at the lower position may increase over time.

Next, the deterioration progress among the battery cabinets 2 are compared. According to the configuration illustrated in FIG. 1, because the plurality of battery cabinets 2 is connected in parallel, the value of the current flowing in each battery cabinet 2 relative to the total current value supplied from the PCS 3 is not always equal. In particular, in the case of the wiring scheme illustrated in FIG. 1, namely the cross-over wiring from the PCS 3, because the resistance value viewed from the PCS 3 to each battery cabinet 2 is different, at a moment when charging-discharging starts from the balanced condition with zero current, a large current flows in the battery cabinet 2 near the PCS 3 (from the view of the wiring). However, the subsequent current distribution behavior, after the current continuously supplied in the same charging or discharging direction, is complex, because such behavior is related to the change in SOC (State of Change. remainder) and the followed change in characteristics, and cannot be expressed uniquely.

Hence, in the application which charging and discharging change at relatively short time cycle, the average current of the battery cabinet 2 from the view of the wiring near the PCS 3 becomes large, thought to result in increase of the heat generation and the temperature rise which may accelerate the deterioration progress.

The above deterioration progress phenomenon can be summarized as the following two types:

(A) in the same battery cabinet 2, the deterioration of the battery module 1 at the higher position in the vertical direction advances fast; and (B) among the battery cabinets 2, the deterioration of the battery module 1 in the battery cabinet 2 with the shorter wiring distance from the PCS 3 advances fast.

However, there are practically other phenomena than those two types, and the deterioration progress phenomenon is more complex because of the initial characteristic variability as the individual variability caused from the manufacturing variability of the battery itself, and the deterioration advancement variability. In most cases, it can be said that the characteristic variability due to the deterioration over time is increasing.

(Performance of Entire Secondary Battery System 10)

Next, the performance of the entire secondary battery system 10 constructed by combining the battery modules 1 that varies in characteristic. With reference to the group of battery modules connected in series in one of the battery cabinet 2, the capacity (Ah) of the one of the battery cabinet 2 does not exceed the capacity of the battery module 1 which has the minimum capacity (e.g., when it is charged from a complete discharge to a full charge in accordance with the battery module 1 that has the maximum capacity, the other battery modules 1 become over discharged or over charged). That is, as for the capacity, the performance of the module that has the lowest performance in the series connection configuration defines the performance of the entire series connection configuration. Conversely, with reference to the group of the battery cabinets 2 connected in parallel, the capacity of the entire system becomes the total of the capacities of each battery cabinets 2 at least in a static viewpoint.

(Exemplary Calculation of System Performance Reduction)

Tables 1-3 in FIGS. 8-10 show exemplary calculations of a system performance reduction. According to the tables, a total of 100 battery modules 1 are described by each cells of a 10×10 matrix, with the battery cabinets 2 in the horizontal direction (total: 10 column) and the batter modules 1 in the battery cabinets 2 in the vertical direction (total: 10 rows). The values in the cells are non-dimensional relative indexes indicating the performance of each battery module 1 (e.g., capacity). The capacity of each battery cabinet 2 is equal to the minimum value of the indexes corresponding to 10 battery modules 1 in the vertical direction, and is indicated below outside the matrix. The entire system performance is a total value of the indexes of the battery cabinets 2, and is indicated in lower right outside the matrix.

Figure 4:
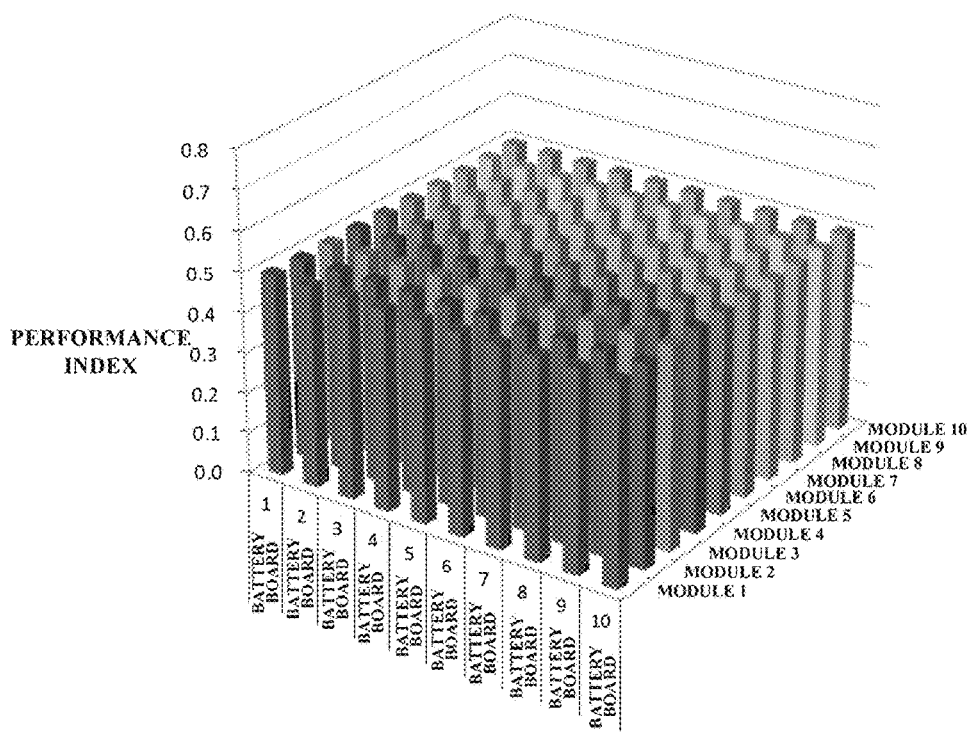
FIG. 4 is a three-dimensional bar graph illustrating a relationship between a battery cabinet and a battery module, and a performance index in a reference status no characteristic variability is present among the battery modules.

Table 1 in FIG. 8 is of a case in which the group of battery modules 1 has no variability in the performance index (all 0.5), and the system performance is 5.000 (also see FIG. 4).

Figure 5:
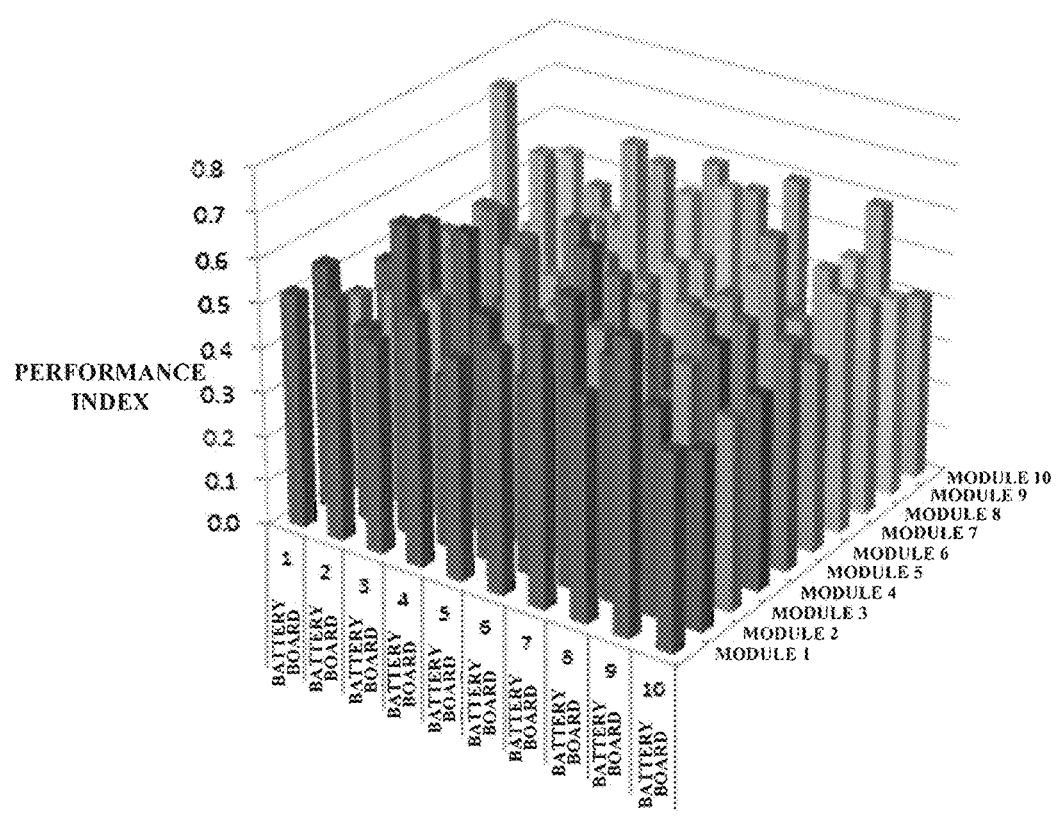
FIG. 5 is a three-dimensional bar graph illustrating a relationship between the battery cabinet and the battery module, and the performance index prior to a re-arrangement in a status the characteristic variability is present among the battery modules.

Conversely, Table 2 in FIG. 9 is of a case in which the group of battery modules 1 automatically generated a random number of average 0.5 and standard deviation 0.2 as the performance index, and the system performance is 3.605 (also see FIG. 5).

That is, result as shown in Table 2, it can be confirmed that the characteristic variability decreases the system performance from 5.000 to 3.605.

(Method of Arranging Battery Modules According to the Present Embodiment)

Figure 6:
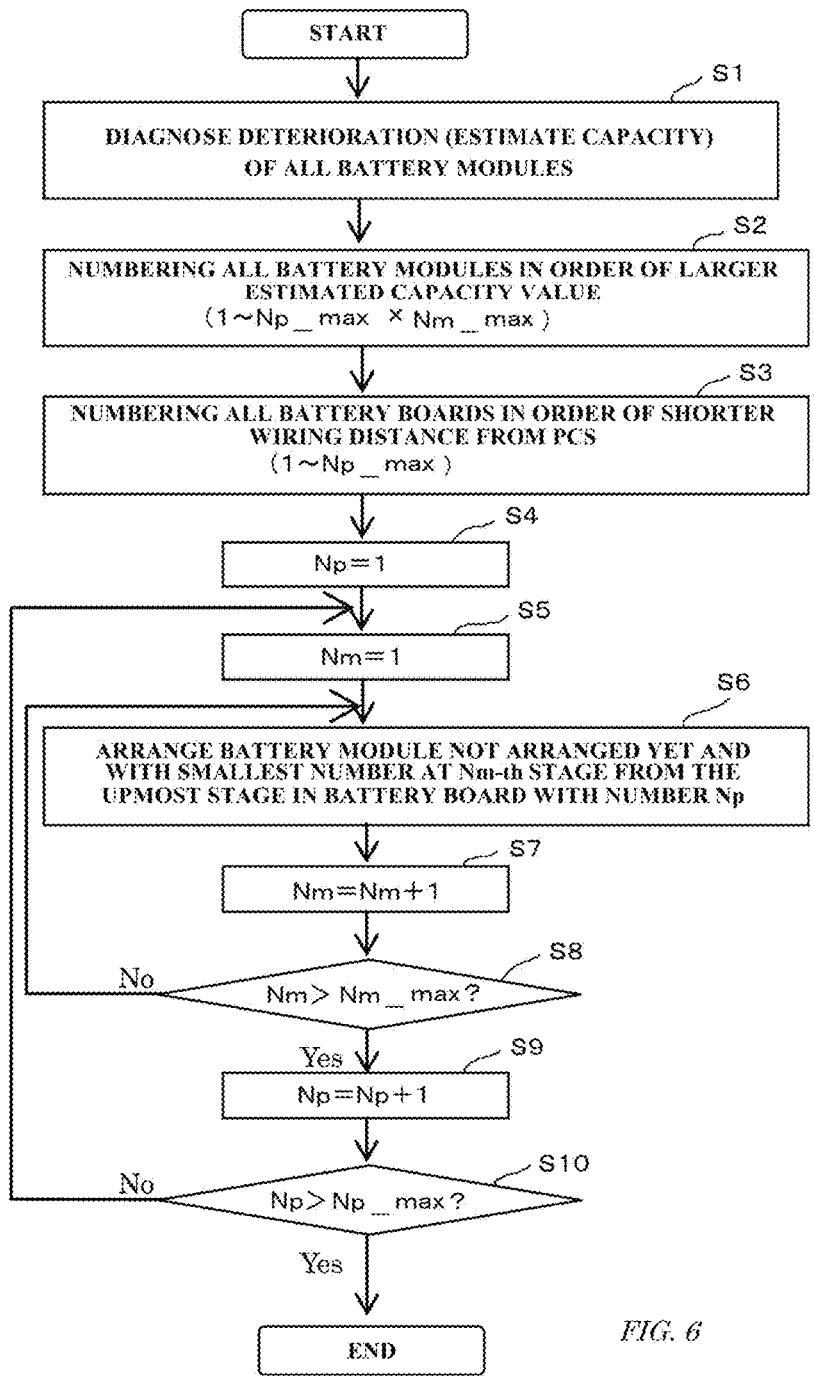
FIG. 6 is a flowchart illustrating a method of arranging battery modules according to an embodiment of the present disclosure.

FIG. 6 shows a flowchart of a method of arranging the battery modules 1 according to the present embodiment. Here, the expression for a system scale is further generalized, and the number of battery cabinet is defined as Np_max, and the number of modules in a battery cabinet is defined as Nm_max.

First, the deterioration inspecting block 11 of the battery controller 7 executes deterioration inspection on all battery modules 1 by for example estimating the capacity of each battery module 1. (step S1). In this case, because each battery module 1 practically includes the plurality of cells, the capacity estimation is first performed on each cell, and the minimum cell capacity in the target battery module 1 is determined as the capacity of the battery module 1.

Next, the numbering block 12 ranks all battery modules 1 in the secondary battery system 10 in the descending order of the capacity estimated in the step S1. That is to say, they are numbered from 1 to Np_max×Nm_max in this order (step S2).

Furthermore, the numbering block 12 performs numbering on all battery cabinets 2 in the system from 1 to Np_max in the ascending order of the distance of the wiring from the PCS 3 (step S3).

Next, the re-arrangement determining block 13 initializes the battery cabinet number Np subjected to the re-arrangement and the battery module number Nm subjected to the re-arrangement in said battery cabinet (step S4, step S5).

Subsequently, the re-arrangement determining block 13 determines the battery module 1 that has the smallest number in the group of unarranged battery modules to be arranged at the Nm-th stage from the top stage in the battery cabinet 2 number Np (step S6). That is, if it is a first determination, the determination is made in such a way that the battery module 1 number 1 is arranged at the top stage in the battery cabinet 2 nearest the PCS 3.

In addition, the re-arrangement determining block 13 repeats the process of the step S6 to the same battery cabinet 2, thereby completing the determination of the position re-arrangement of the battery modules 1 in said battery cabinet 2 (step S7, step S8).

Furthermore, the re-arrangement determining block 13 repeats the processes of the steps S6-S8, thereby completing the determination of the position re-arrangement of the battery modules 1 for all battery cabinets 2 in the system (step S9, step S10).

Finally, the battery modules 1 are actually re-arranged based on the position re-arrangement of the battery modules 1 determined in the process illustrated in FIG. 6. The re-arrangement may be performed by unillustrated re-arranging means.

Effects of the Present Embodiment

The effects by the determination of the position re-arrangement of the battery modules 1 by the process in FIG. 6 will be explained with reference to Table 3 in FIG. 10 and FIG. 7.

Table 3 shows a relationship between the battery cabinet 2 and the battery module 1, and the performance index of when the re-arrangement determination is made by the procedures illustrated in FIG. 6 with the characteristic variability being present among the battery modules 1 illustrated in Table 2.

Figure 7:
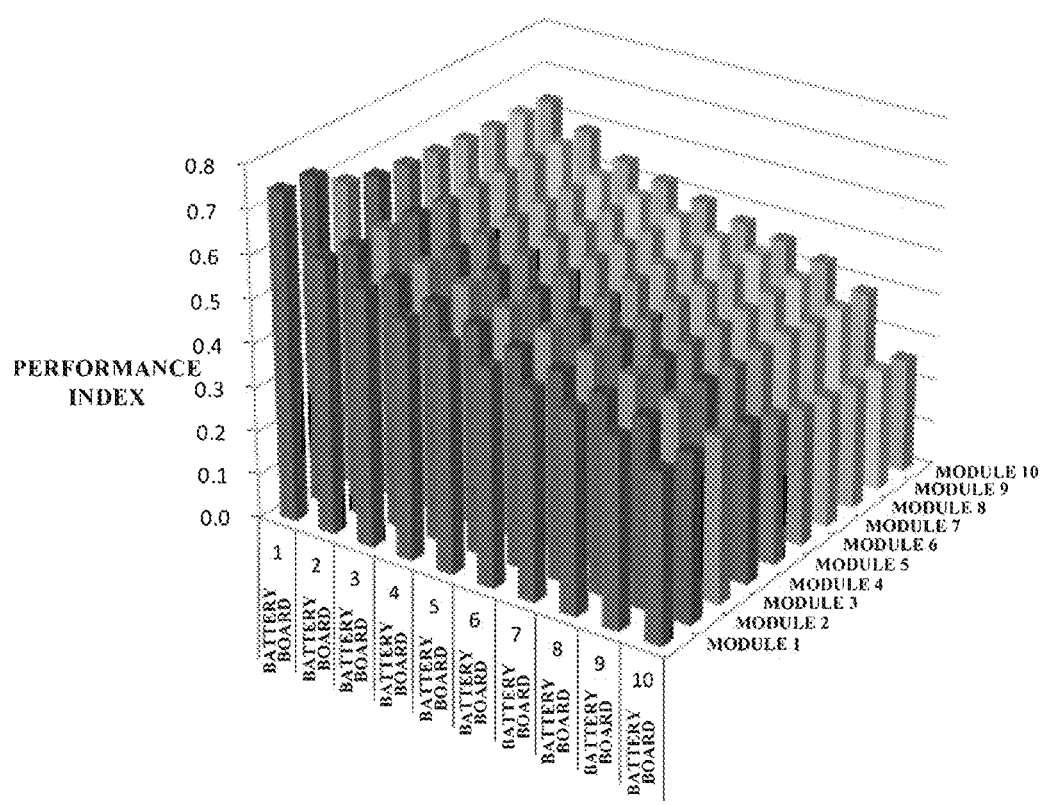
FIG. 7 is a three-dimensional bar graph illustrating a relationship between the battery cabinet and the battery module, and the performance index after the re-arrangement in a status the characteristic variability is present among the battery modules.

From the result in Table 3, it can be seen that although a relatively large performance index difference is present among the battery cabinets 2, the performance index difference among the battery modules 1 in each battery cabinet 2 decreases, and consequently, the system performance becomes 4.824 which is remarkably improved from 3.605 in Table 2 prior to the re-arrangement (also see FIG. 7). Hence, it is proved that the decreased system performance due to the characteristic variability is recovered by applying the method of re-arranging the battery modules according to the present embodiment.

Hence, the method of re-arranging the battery modules according to the present embodiment is suitably applicable to maintain the system performance of, in particular, a large-scale secondary battery system operated for a long term. In addition, the method is also applicable to an initial arrangement of a secondary battery system that initially includes a group of battery modules which have various characteristics.

Other Embodiments (1) In the above embodiment, the capacity is utilized as the characteristic value, but the internal resistance may be utilized instead. In an application which the secondary batteries are fully utilized from the full charge to the complete discharge, the capacity is an important parameter, but in, for example, an application to suppress a fluctuation of a solar power generation and a wind power generation, an available output at a certain timing is rather important than the capacity and therefor it is effective to utilize the internal resistance as the characteristic value rather than the capacity in such case.

(2) In the above embodiment, the arrangement of the battery modules 1 in the battery cabinet 2 and the arrangement of the battery cabinets 2 are simultaneously executed, however an arrangement of the battery modules 1 in the battery cabinet 2 may be executed alone. That is, the characteristic values of the battery modules 1 in the battery cabinet 2 may be set in sequential numbers to only suppress the characteristic variability within the battery cabinet 2.

However, in view of the change in characteristic variability due to the system operation after the arrangement, arrangement in view of the above two points (A) and (B) as for the deterioration progress phenomenon is advantageous for suppressing an increase of the characteristic variability. That is, in the battery cabinet 2, in general, a temperature gradient due to the installation position of the battery module 1 and the resultant deterioration speed gradient are present, so it is advantageous to arrange the battery module 1 with little deterioration to the one with the faster deterioration speed.

Likewise, when there is a difference in wiring length (wiring resistance) from the PCS 3 among the battery cabinets 2, it is advantageous to arrange the battery module 1 with the little deterioration to the one with smaller wiring resistance, for it is expected that the current value of when the drive current of PSC 3 changes gets larger as the wiring resistance gets smaller, resulting in than acceleration of the deterioration speed. Accordingly, arrangement of the battery cabinet 2 with a satisfactory characteristic value (e.g., total value or am average value of characteristic values of built-in battery modules 1) to the one with the smaller wiring resistance is also advantageous.

(3) The arrangement order in the battery cabinet 2, and the arrangement order among the battery cabinets 2 may be made without a consideration of the suppression of an increase of the characteristic variability (namely, equalization). When, for example, all battery modules 1 have a replacement cycle every five years, the facility costs in said year will be especially large because all battery modules will be replaced. One method that can be thought is to proceed, every year, replacing the part of the battery modules 1 where deterioration especially progress by rather increasing the characteristic variabilities. In this case, it is rather advantageous to arrange the battery module 1 with larger deterioration to the one with faster deterioration speed. Even in this case, however, it is still essential to ensure the uniformity of the characteristics of the group of battery modules 1 connected in series.

(4) The method of arranging the battery modules according to the above embodiment may first be executed considering the initial manufacturing variability of each battery module 1 when starting system operation, but as a result of operation, the characteristic variability may increase over time. Hence, it is effective to recover the system performance by having re-arrangement periodically, for example every few years. In addition, the method can operate the re-arrangement by the situation of the system performance reduction in accordance with the inspection of all battery modules 1 performed regularly/irregularly (the inspection can be performed online during the operation), not the elapsed time.

In addition, when the system is partly updated or is expanded, it is advantageous that the method of re-arranging the battery modules according to the present embodiment in accordance with a condition in which the battery modules 1 manufactured at different times are mixed.

(5) In the above embodiment, the deterioration inspecting block 11 in the battery controller 7 inspects the deterioration of the battery module 1, the numbering block 12 executes numbering on the battery modules 1, and the re-arrangement determining block 13 determines the re-arrangement position, however an external device of the battery controller 7 may accomplish those functions.

(6) In the above embodiment, the numbering block 12 performs a numbering on the respective battery modules in an ascending order of the obtained characteristics by the deterioration inspected block 11, but the numbering may be made in the descending order. Likewise, the numbering block 12 performs a numbering on the respective battery cabinets 2 in the ascending order of the high resistance value in accordance with the wiring resistance value between the PCS 3 and the battery cabinet 2, but the numbering may be made in the descending order.

(7) Several embodiments of the present disclosure were explained above, however these embodiments are merely presented as examples, and are not intended to limit the scope of the present disclosure. These embodiments can be carried out in other various forms, and various omissions, replacements, and modifications can be made thereto without departing from the scope of the present disclosure. Such embodiments and modified formed thereof are within the scope of the present disclosure, and also within the scope of the invention as recited in the appended claims and the equivalent range thereto.

The invention claimed is:

1. A secondary battery system comprising:
a battery cabinet group comprising a plurality of battery cabinets each comprising a plurality of battery modules connected to each other;

a PCS (Power Conditioning System) connected to the battery cabinet group and is controlling charging and discharging of the battery cabinet group; and a battery controller connected to the PCS, wherein the battery controller comprises:

a deterioration inspecting block obtaining a characteristic of each of the battery modules to inspect a deterioration status thereof;

a numbering block numbering each of the battery modules in an ascending order of deterioration based on the characteristic obtained from the deterioration inspecting block, and numbering each of the battery cabinets in an ascending order of wiring distance between each of the battery cabinets and the PCS; and a re-arrangement determining block determining a re-arrangement position of each of the battery modules that allows the battery modules to be re-arranged in the battery cabinets in an order so that the ascending order of deterioration for the battery modules corresponds with the ascending order of wiring distance for the battery cabinets.

2. The secondary battery system according to claim 1, wherein:

at least one of the battery cabinets comprises the plurality of battery modules connected in series, at least one of the battery modules comprising one or a plurality of cells connected in parallel, the one or a plurality of cells being a minimum unit of a secondary battery; and the plurality of battery cabinets is connected in parallel to form the battery cabinet group.

3. The secondary battery system according to claim 1, wherein the characteristic of the battery module is a capacity.

4. The secondary battery system according to claim 1, wherein the characteristic of the battery module is an internal resistance.

5. The secondary battery system according to claim 1, wherein the re-arrangement determining block determines the re-arrangement position of the battery modules so that the numbering of the battery modules is in the ascending order of deterioration, and the numbering of the battery modules is given from a higher temperature to a lower temperature in a gradient direction of an ambient temperature in at least one of the battery cabinets.

6. The secondary battery system according to claim 1, wherein:

the numbering block performs numbering on each of the battery cabinets in an order from a lower resistance value to a higher resistance value along a wiring resistance value between the PCS and each of the battery cabinets; and the re-arrangement determining block determines the re-arrangement position of the battery modules in an order of deterioration of the battery cabinets from a smaller to a larger deterioration along the numbering on each of the battery cabinets.

7. The secondary battery system according to claim 2, wherein the characteristic of the battery module is a capacity.

8. The secondary battery system according to claim 2, wherein the characteristic of the battery module is an internal resistance.

9. The secondary battery system according to claim 2, wherein the re-arrangement determining block determines the re-arrangement position of the battery modules so that the numbering of the battery modules is in the ascending order of deterioration, and the numbering of the battery modules is given from a higher temperature to a lower temperature in a gradient direction of an ambient temperature in at least one of the battery cabinets.

10. The secondary battery system according to claim 2, wherein:

the numbering block performs numbering on each of the battery cabinets in an order from a lower resistance value to a higher resistance value along a wiring resistance value between the PCS and each of the battery cabinets; and the re-arrangement determining block determines the re-arrangement position of the battery modules in an order of deterioration of the battery cabinets from a smaller to a larger deterioration along the numbering on each of the battery cabinets.

* * * * *